(12) United States Patent
Foote

(10) Patent No.: US 8,698,945 B2
(45) Date of Patent: Apr. 15, 2014

(54) AUTOFOCUS APPARATUS AND METHOD

(75) Inventor: William Foote, Edinburgh (GB)

(73) Assignee: STMicroelectronics (Research & Development) Limited, Marlow, Buckinghamshire (GB)

( * ) Notice: Subject to any disclaimer, the term of this patent is extended or adjusted under 35 U.S.C. 154(b) by 353 days.

(21) Appl. No.: 13/189,746

(22) Filed: Jul. 25, 2011

(65) Prior Publication Data

US 2012/0019676 A1      Jan. 26, 2012

(30) Foreign Application Priority Data

Jul. 26, 2010    (GB) .................................. 1012459.2

(51) Int. Cl.
*H04N 5/232*      (2006.01)
(52) U.S. Cl.
USPC .......................................... 348/351; 348/349
(58) Field of Classification Search
USPC ................... 348/345, 349–356, 208.1, 208.7, 348/208.11–208.13
See application file for complete search history.

(56) References Cited

U.S. PATENT DOCUMENTS 5,305,045 A      4/1994   Terada
2010/0182490 A1*  7/2010   Seol et al. ................... 348/345

FOREIGN PATENT DOCUMENTS

JP            03117182 A       5/1991

OTHER PUBLICATIONS

UK Search Report mailed Nov. 5, 2010 for GB1012459.2 (1 page).
English Language Abstract of JP03117182A (1 page), Dated May 17, 1991.

* cited by examiner

*Primary Examiner* — Tuan Ho
(74) *Attorney, Agent, or Firm* — Gardere Wynne Sewell LLP

(57) ABSTRACT

In automatically focusing on a subject in the field of view of a camera device, the camera device sets a focal length successively at one or more focal positions with an angle of the focus plane tilted so as not to be orthogonal to a normal optical path through the camera device. An image is taken at each of the focal positions. A comparison of data from each image is made so as to determine best focus. This comparison includes comparing data from at least two different locations along the tilted focus plane of at least one of the images.

31 Claims, 4 Drawing Sheets

AUTOFOCUS APPARATUS AND METHOD

PRIORITY CLAIM

The present application claims priority from United Kingdom Application for Patent No. 1012459.2 filed Jul. 26, 2010, the disclosure of which is hereby incorporated by reference.

TECHNICAL FIELD

The invention relates to autofocus systems and in particular to passive autofocus systems.

BACKGROUND

Passive autofocus camera systems achieve a sharp focus position by stepping through a series of focal positions frame by frame and analyzing the sharpness statistics in the image captured by the camera in each frame. The statistics allow the algorithm to determine the best focus position for the actuator to 'move' to. Existing systems require at least one frame taken at each focal position, and depending on the specification of the camera this can take many frames to determine the position of best focus. This leads to the poor autofocus convergence time which is undesirable to the user.

In particular, autofocus convergence time on simpler mobile phone camera systems is typically very slow. This means an unpleasant delay for the user waiting for autofocus convergence before taking the still image, which can result in missed picture opportunities.

There is a need in the art to alleviate the above drawbacks by reducing this delay.

SUMMARY

In a first aspect there is provided a camera device comprising at least one lens, sensor means for receiving an image, focus means operable to adjust the focal length of the camera device, plane adjustment means operable to adjust the angle of the focus plane; and a controller; wherein said controller is operable to control said focus means and plane adjustment means so as to automatically focus on a subject in the field of view of the camera device by setting the focal length of the camera device successively at one or more focal positions while said angle of the focus plane is tilted so as not to be orthogonal to the optical path; said camera device being further operable to take an image at each of said focal positions and to perform a comparison of data from each image so as to determine best focus, said comparison including the comparing of data from at least two different locations along the tilted focus plane of at least one of said images.

Said focus means may comprise a motor operable to move said at least one lens linearly along the optical path.

Said plane adjustment means may form part of an image stabilization system.

Said plane adjustment means may, for example, comprise means to tilt the lens. Alternatively said plane adjustment means may comprise means to alter the shape of the lens or, where said lens is a compound lens, to move one component lens from which said compound lens is comprised, relative to the others, such that the lens's optical strength changes across the Field Of View. In the latter case, said movement may be perpendicular to the optical path.

Said comparison may comprise data from at least two different locations on said tilted focus plane for each image taken. The number of locations compared from each image may be the same for each of the images. Alternatively the number of locations compared may tend to be greater for images taken at longer focal lengths.

At least some of said locations from which data is taken for said comparison may each define a region of interest, the camera device being operable to perform said comparison over each region of interest. Said regions of interest may comprise a line perpendicular to the axis of tilt of said tilted focus plane, substantially centered in the field of view.

Said plane adjustment means may be operable to set the angle of the focus plane such that said axis of tilt is horizontal, vertical or diagonal.

Said data for comparison may comprise image contrast or sharpness statistics.

In a second aspect there is provided a method of automatically focusing on a subject in the field of view of a camera device comprising: setting the focal length of the camera device successively at a one or more focal positions while said angle of the focus plane is tilted so as not to be orthogonal to the optical path; taking an image at each of said focal positions; and performing a comparison of data from each image so as to determine best focus, said comparison including the comparing of data from at least two different locations on said tilted focus plane for at least one of said images.

Said comparison may comprise data from at least two different locations along said tilted focus plane for each image taken. The number of locations compared from each image may be the same for each of the images. The number of locations compared may tend to be greater for images taken at longer focal lengths.

The number of images taken for a single autofocus may be between 1 and 6. More specifically, the number of images taken for a single autofocus may be between 2 and 5.

At least some of said locations from which data is taken for said comparison may each define a region of interest, and the camera device may be operable to perform said comparison over each region of interest. Said regions of interest may be comprised in one or more lines perpendicular to the axis of tilt of said tilted focus plane, substantially centered in the field of view.

Said plane adjustment means may set the angle of the focus plane such that said axis of tilt is horizontal or vertical. Said plane adjustment means may set the angle of the focus plane such that said axis of tilt may additionally be diagonal.

Said data for comparison may comprise image contrast or sharpness statistics.

In a further aspect there are provided computer program instructions which, when performed by a processor, causes the processor to control a suitable device so as to perform the method as described in the second aspect.

Said program instructions may be comprised within firmware or may be carried on a computer readable medium.

BRIEF DESCRIPTION OF THE DRAWINGS

Embodiments of the invention will now be described, by way of example only, by reference to the accompanying drawings, in which.

DETAILED DESCRIPTION OF THE DRAWINGS

Figure 1:
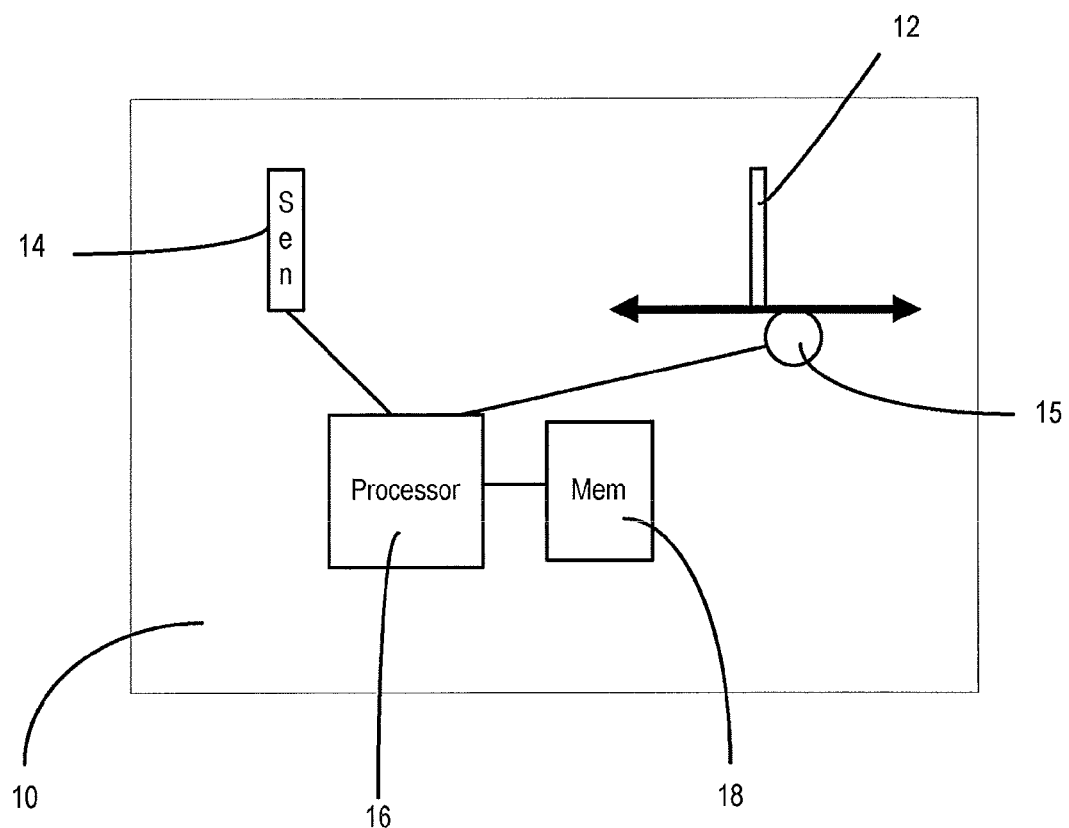
FIG. 1 shows the elements which make up a typical passive autofocus system for a camera.

FIG. 1 shows schematically the elements which make up a typical passive autofocus system for a camera 10. The camera 10 includes a lens 12 (which may be a compound lens), a sensor 14 (such as a pixel array), a motor 15 for moving the lens so as to change the focal length of the system, and a microprocessor 16 with associated memory 18.

Figure 2:
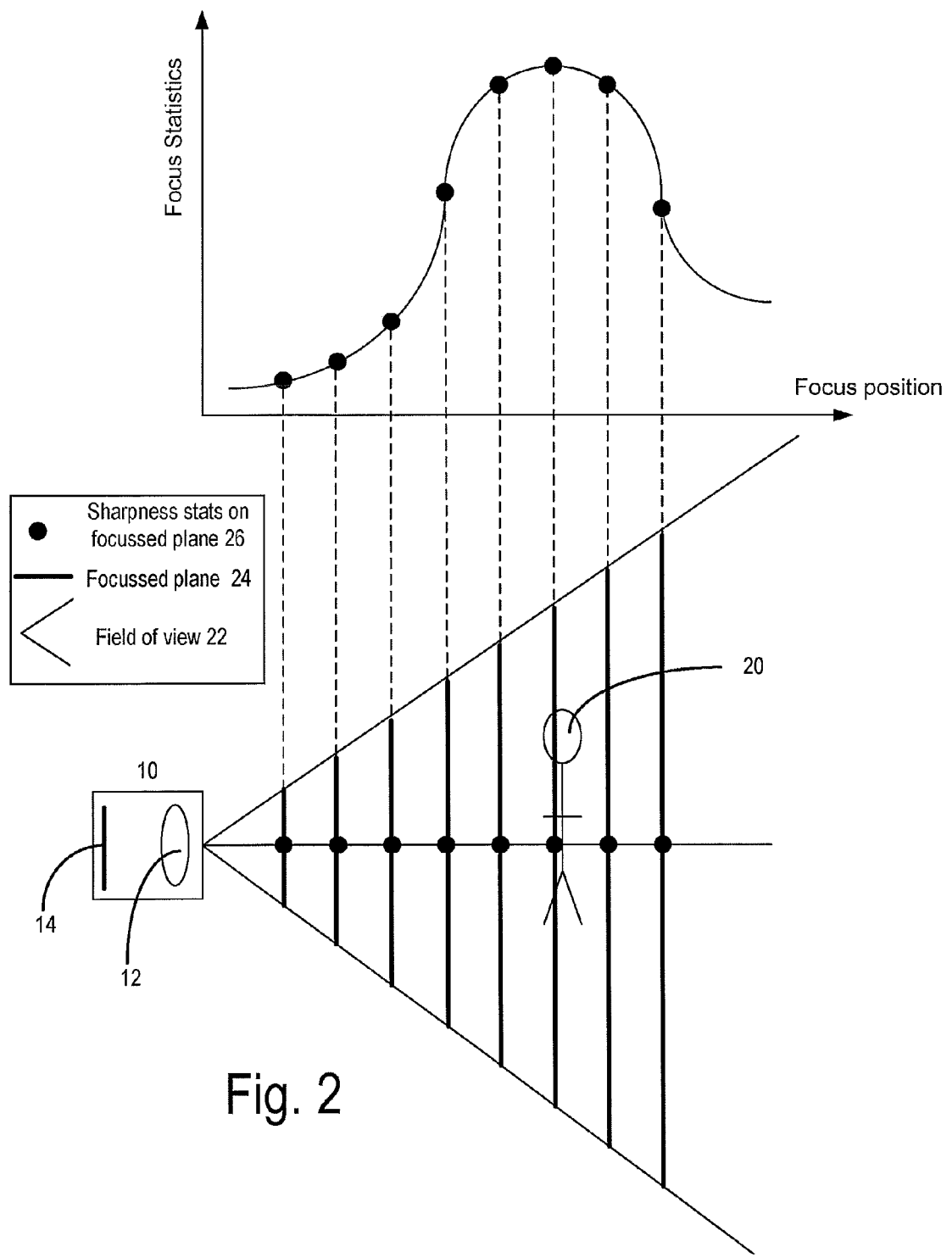
FIG. 2 illustrates how the passive autofocus system of FIG. 1 operates.

FIG. 2 illustrates how such a passive autofocus system works. The camera 10 is pointed toward an object 20 to be photographed. Lines 22 indicate the camera's field of view. Under control of the microprocessor 16, the lens 12 is moved through a series of focal positions frame by frame, as indicated by focused plane lines 24. At each of these focal positions an image is obtained, and either stored in memory 18 for later analysis and comparison, or analyzed such that the results of this analysis are stored for later comparison to results at the other focal positions. Presently, a typical fast system takes 8-12 of these images to determine focus for a single picture.

Analysis typically involves considering contrast or sharpness statistics such as illustrated in the graph of FIG. 2. Each dot 26 on the graph represents the sharpness level of the picture at a particular region of interest, in this case at the center of the image. The measured contrast is at its maximum when the object 20 is at, or closest to, the focal plane 24. Therefore, the camera will take the final picture at the focal plane setting 24 which has the maximum sharpness at the region of interest. The algorithm will therefore perform a "hill climb" search by stepping along different positions, finding a rough peak, and performing a finer search around peak. This usually takes 6 to 12 steps for the algorithm to complete.

While FIG. 2 shows a system which considers only a single region of interest at the center of the composition, many other such autofocus systems define more than just the one region of interest. The results from these multiple regions of interest can be used together for improved reliability, or can be used in isolation for improved specificity.

Another feature commonly found on camera devices is Optical Image Stabilization (OIS). A variety of Optical Image Stabilization (OIS) techniques are available. Some of these techniques compensate for user handshake (which can result in a change of angle of the camera unit) by altering the angle of tilt of the focus plane accordingly. This can be done, depending on the specific system, by altering the angle of tilt of the lens barrel relative to the pixel array, altering the angle of tilt of the whole module, or altering the shape of the lens such that its optical strength changes across the Field Of View (FOV). These technologies are an extension of typical autofocus systems, by essentially adding rotational axes of movement to the existing single motion on a linear axis.

It is proposed to take advantage of the OIS functionality in camera devices so equipped, which have the ability to tilt the focal plane, to improve the passive autofocus functionality, in particular by speeding up the autofocus process.

Figure 3:
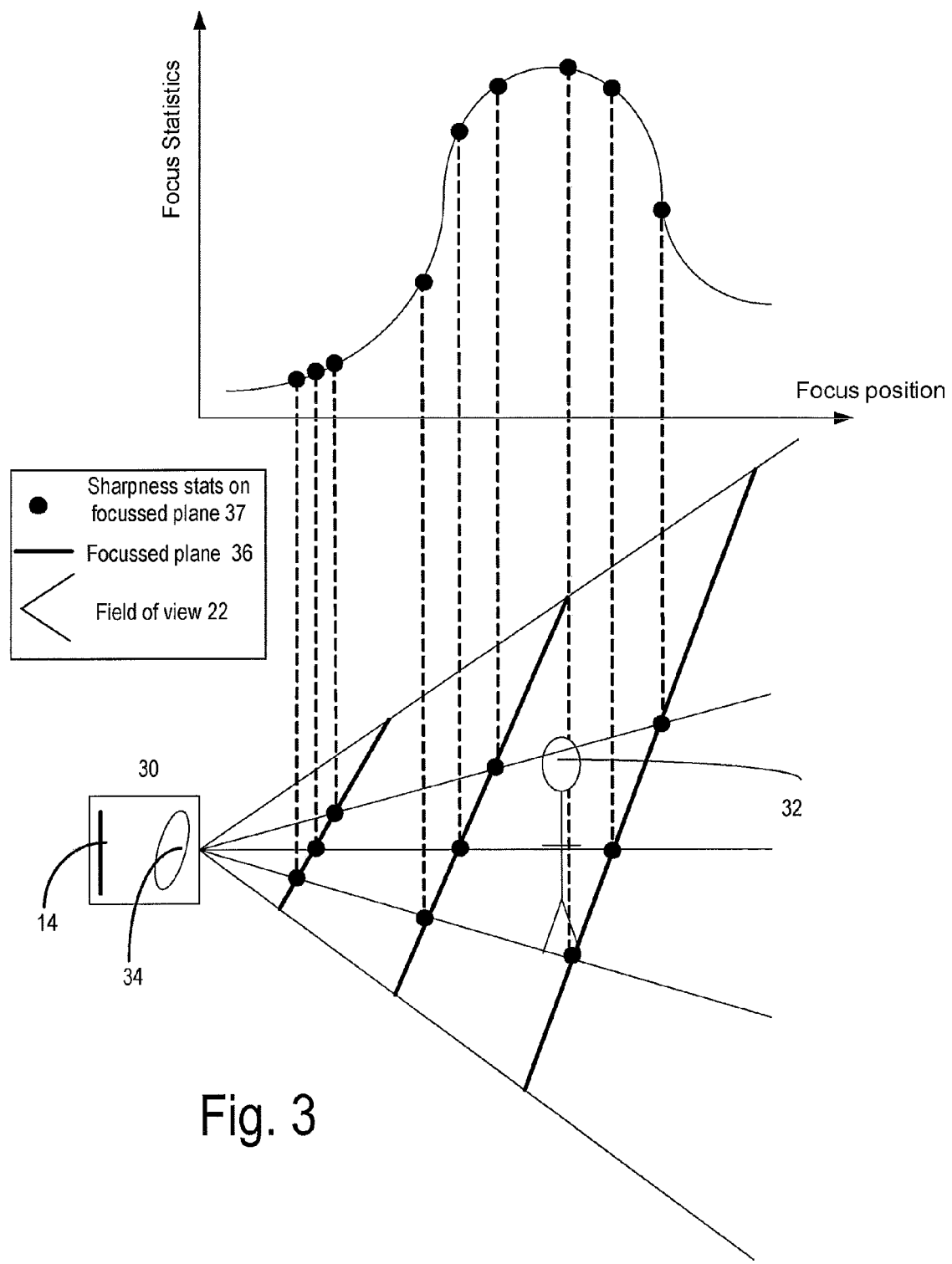
FIG. 3 illustrates how the passive autofocus system of the present invention operates.

FIG. 3 illustrates how this may be achieved. Again a camera 30 is pointed at an object 32, some distance away. The angle of the lens 34 is tilted resulting in a tilt of the resulting focal planes 36 (tilted with respect to a normal optical path relative to the sensor 14). Because of the focal planes' tilt, each position 37 on the actual focal plane 36 of the lens is at a different distance relative to the distance between camera 30 and object 32; that is at a different focal plane relative to the plane of the object 32. Consequently, in the example of FIG. 3, only three frames need to be taken to obtain contrast statistics at nine fairly evenly spaced apart focal lengths between camera 30 and object 32, as opposed to the eight frames required to cover essentially the same depth, from the near field to the far field, as in the example of FIG. 2. Overall, this type of system should typically take 1-6 images to determine focus for a single picture, the amount of images being largely determined by the maximum achievable tilt of the focus plane. It will be appreciated that the system illustrated by FIG. 3 collects the contrast statistics over different regions of interest, as opposed to the single central region of interest of the system illustrated by FIG. 2.

In theory, it is possible to have any number of regions of interest, which may have any shape, any size, or be in any position. Some algorithms will average sharpness statistics across all regions of interests equally, while others will select/weight center regions of interests more heavily, or select/weight regions of interest which contain sharpness statistics greater than a certain threshold. An important criteria with the proposed system is to select only the zones which cover the object of interest, and ensuring a gradient of tilt across that object. For this reason, relatively small zones have been chosen, as illustrated below.

Figure 4:
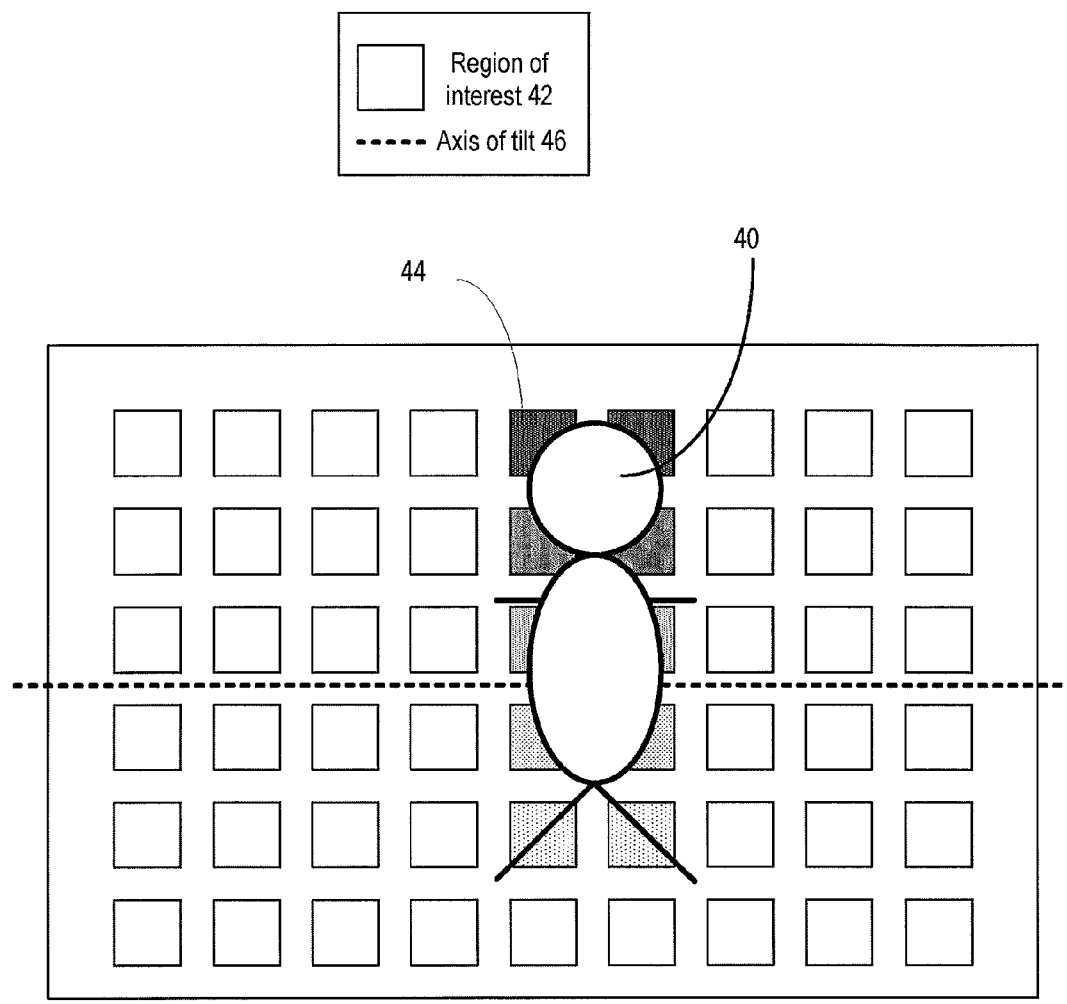
FIG. 4 illustrates an example of how multiple regions of interest might be used on a single object that is the subject of the picture.

FIG. 4 illustrates an example of how multiple regions of interest might be used on a single object 40. Each square 42 represents a possible region of interest forming (in this example) a grid of 6×9 of equally fixed sized boxes which cover most of the field of view. The actual regions of interest being used at any one time depends on the axis of tilt of the focal plane, which can be modified to be horizontal, vertical or even diagonal depending on the orientation of the object 40, such that the axis of tilt and the orientation of the object are approximately perpendicular to each other. This ensures the greatest chance that the regions of interest coincide with the position of the object. In this example the shaded squares 44 represent the regions of interest for the horizontal axis of tilt of the focal plane illustrated. The shaded squares 44 have different shading to indicate that different optical strengths exist moving perpendicularly to the axis of tilt, and hence cause different sharpness levels across the object.

It may be possible, in some configurations, to change angle of tilt mid-convergence.

As with many conventional autofocus systems, this system does rely on the object being fairly central in the field of view, but also relies on the object being large enough in one dimension to cover multiple regions of interest perpendicular to the axis of tilt. Consequently, the proposed system would not work with a small "spot" object fitting inside only a single region of interest. In such cases the device may be switched into a conventional autofocus or manual focus mode.

Another issue with using multiple regions of interest is that the object might be quite different in each of the regions of interest. For example, when measuring three regions of interest on a human subject, you may have one region covering hair, another covering skin and another covering clothing. Therefore three quite different graphs will be obtained. In such a case the algorithm will, in a particular embodiment, consider all the graphs from the selected region of interest and then normalize them to make a single graph. Other weighting options are possible within the scope of the invention and may be preferred, depending on the application.

It will be appreciated that the specific embodiments described above are described by way of example only and other embodiments and variations can be envisaged without departing from the spirit or scope of the invention.

What is claimed is:

1. A camera device comprising:
at least one lens,
a sensor operable to receive an image, a focusing device operable to adjust a focal length of the camera device, the focal length being a linear distance between the at least one lens and the sensor;

a plane adjustment device operable to adjust an angle of a focus plane to define a tilted focus plane that is not orthogonal to a normal optical path with respect to said sensor; and an electronic controller operable to control said focusing device and plane adjustment device so as to focus on a subject in a field of view of the camera device by setting the focal length of the camera device with the tilted focus plane successively at one or more focal positions;

said camera device further operable to take an image at each of said one or more focal positions at the tilted focus plane for generating focus statistics at the electronic controller performing a comparison of data obtained from the focus statistics so as to determine a correct focal distance for a best focus, said comparison including comparing of data from at least two different locations along the tilted focus plane for at least one image.

2. The camera device as claimed in claim 1 wherein said plane adjustment device forms part of an image stabilization system.

3. A camera device, comprising:
at least one lens;
a sensor operable to receive an image;
a focusing device operable to adjust a focal length of the camera device;
a plane adjustment device operable to tilt the lens to adjust an angle of a focus plane to define a tilted focus plane that is not orthogonal to a normal optical path with respect to the sensor; and
a controller operable to control said focusing device and plane adjustment device so as to focus on a subject in a field of view of the camera device by setting the focal length of the camera device with the tilted focus plane successively at one or more focal positions;
said camera device further operable to take an image at each of said focal positions and perform a comparison of data obtained from each image so as to determine a best focus, said comparison including comparing of data from at least two different locations along the tilted focus plane for at least one image.

4. The camera device as claimed in claim 2 wherein said plane adjustment device is operable to alter a shape of the lens.

5. The camera device as claimed in claim 2 wherein said lens is a compound lens and wherein said plane adjustment device comprises means for moving one or more component lenses of said compound lens relative to others one or more component lenses, such that an optical strength of the compound lens changes across a Field Of View.

6. A camera device, comprising:
at least one lens;
a sensor operable to receive an image;
a focusing device operable to adjust a focal length of the camera device;
a plane adjustment device operable to adjust an angle of a focus plane to define a tilted focus plane that is not orthogonal to a normal optical path with respect to said sensor; and
a controller operable to control said focusing device and plane adjustment device so as to focus on a subject in a field of view of the camera device by setting the focal length of the camera device with the tilted focus plane successively at one or more focal positions;

said camera device further operable to take an image at each of said focal positions and perform a comparison of data obtained from each image so as to determine a best focus, said comparison including comparing of data from at least two different locations along the tilted focus plane for at least one image, wherein said comparison comprises further comparing data from at least two different locations along said tilted focus plane for a plurality of different images taken.

7. The camera device as claimed in claim 6 operable such that the number of different locations along said tilted focus plane that are compared is the same for the plurality of different images taken.

8. The camera device as claimed claim 6 wherein a number of the different locations along said tilted focus plane that are compared is greater for an image that is taken at a longer focal length than for an image that is taken at a shorter focal length.

9. The camera device as claimed in claim 1 wherein the number of images taken to make a best focus determination is between 1 and 6.

10. The camera device as claimed in claim 1 wherein the number of images taken to make a best focus determination is between 2 and 5.

11. A camera device, comprising:
at least one lens;
a sensor operable to receive an image;
a focusing device operable to adjust a focal length of the camera device;
a plane adjustment device operable to adjust an angle of a focus plane to define a tilted focus plane that is not orthogonal to a normal optical path with respect to said sensor; and
a controller operable to control said focusing device and plane adjustment device so as to focus on a subject in a field of view of the camera device by setting the focal length of the camera device with the tilted focus plane successively at one or more focal positions;
said camera device further operable to take an image at each of said focal positions and perform a comparison of data obtained from each image so as to determine a best focus said comparison including comparing of data from at least two different locations along the tilted focus plane for at least one image, wherein at least some of said locations along said tilted focus plane from which data is taken for said comparison each define a region of interest, the camera device being operable to perform said comparison over each region of interest.

12. The camera device as claimed in claim 11 wherein said regions of interest are comprised in one or more lines perpendicular to an axis of tilt of said tilted focus plane and which are substantially centered in the field of view.

13. The camera device as claimed in claim 1 wherein said plane adjustment device is operable to set an angle of the focus plane such that an axis of tilt is horizontal.

14. The camera device as claimed in claim 1 wherein said plane adjustment device is operable to set an angle of the focus plane such that an axis of tilt is vertical.

15. The camera device as claimed in claim 1 wherein said plane adjustment device is operable to set an angle of the focus plane such that an axis of tilt is diagonal.

16. The camera device as claimed in claim 1 wherein said data for comparison comprises image contrast or sharpness statistics.

17. The camera device as claimed in claim 1 wherein said focusing device comprises a motor operable to move said at least one lens linearly along the normal optical path.

18. A method of automatically focusing on a subject in the field of view of a camera device comprising:

setting a focal length of the camera device successively at one or more focal positions with an angle of the focus plane tilted so as not to be orthogonal to a normal optical path through the camera device;

taking an internal sample image at each of said focal positions for generating focus statistics; and determining a correct focal distance between the lens and the image sensor by performing a comparison of data from each image so as to determine best focus, wherein the comparison includes comparing the focus statistics data from at least two different locations along the tilted focus plane of at least one of said images.

19. The method as claimed in claim 18 wherein comparing the focus statistics data comprises comparing data from at least two different locations along said tilted focus plane for a plurality of images taken.

20. The method as claimed in claim 19 wherein a number of locations along the tilted focus plane compared from each of the plurality of images is the same.

21. The method as claimed in claim 19 wherein a number of locations along the tilted focus plane that are compared is greater for an image taken at a longer focal length than for an image taken at a shorter focal length.

22. The method as claimed in claim 18 wherein the number of images taken for automatically focusing on the subject is between 1 and 6.

23. The method as claimed in claim 18 wherein the number of images taken for automatically focusing on the subject is between 2 and 5.

24. The method as claimed in claim 18 wherein at least some of said locations from which data is taken for said comparison each define a region of interest, and wherein performing the comparison comprises perform said comparison over each region of interest.

25. The method as claimed in claim 24 wherein said regions of interest are comprised in one or more lines perpendicular to an axis of tilt of said tilted focus plane and are substantially centered in the field of view.

26. The method as claimed in claim 18 wherein an axis of the focus plane tilt is horizontal.

27. The method as claimed in claim 18 wherein an axis of the focus plane tilt is vertical.

28. The method as claimed in claim 18 wherein an axis of the focus plane tilt is diagonal.

29. The method as claimed in claim 18 wherein said data for comparison comprises image contrast or sharpness statistics.

30. The method as claimed in claim 18 wherein the method is implemented in a non-transitory computer readable medium executing computer program instructions which, when performed by a processor, causes the processor to control a suitable device so as to perform the method as claimed in claim 18.

31. The method as claimed in claim 18 wherein the method is implemented using firmware installed in a non-transitory computer readable medium comprising program instructions which, when performed by a processor, causes the processor to control a suitable device so as to perform the method as claimed in claim 18.

* * * * *